United States Patent
Schmidt et al.

(10) Patent No.: US 7,262,863 B2
(45) Date of Patent: Aug. 28, 2007

(54) DISTANCE MEASURING DEVICE

(75) Inventors: Dierk Schmidt, Leinfelden-Echterdingen (DE); Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 244 days.

(21) Appl. No.: 10/516,584

(22) PCT Filed: May 26, 2003

(86) PCT No.: PCT/DE03/01686

§ 371 (c)(1),
(2), (4) Date: Dec. 2, 2004

(87) PCT Pub. No.: WO2004/021037

PCT Pub. Date: Mar. 11, 2004

(65) Prior Publication Data

US 2005/0172696 A1 Aug. 11, 2005

(30) Foreign Application Priority Data

Aug. 28, 2002 (DE) ................................ 102 39 448

(51) Int. Cl.
*G01B 11/14* (2006.01)
*G01C 5/00* (2006.01)

(52) U.S. Cl. .......................................... 356/614; 356/3
(58) Field of Classification Search .................... 356/3, 356/614
See application file for complete search history.

(56) References Cited

U.S. PATENT DOCUMENTS

| 5,381,694 | A | 1/1995 | Glynn et al. |
| 6,072,427 | A | 6/2000 | McEvann |
| 6,104,250 | A | 8/2000 | Eckersten et al. |
| 6,384,770 | B1 * | 5/2002 | de Gouy et al. ............ 342/120 |
| 6,486,826 | B1 | 11/2002 | Cramer et al. |

FOREIGN PATENT DOCUMENTS

| DE | 198 11 550 | 9/1999 |
| DE | 198 13 604 | 9/1999 |
| GB | 2 336 493 A | 10/1999 |

* cited by examiner

*Primary Examiner*—Roy M. Punnoose
(74) *Attorney, Agent, or Firm*—Michael J. Striker

(57) ABSTRACT

A distance measuring device has at least one oscillator (26) which produces a basic signal at a fundamental frequency ($f_0$) and a first circuit device (30) which produces a first signal at a first frequency ($f_1$) which is higher than the fundamental frequency ($f_0$). The first circuit device (30) has at least one PLL circuit (32) and one VCO circuit (34).

5 Claims, 1 Drawing Sheet

DISTANCE MEASURING DEVICE

CROSS-REFERENCE

The invention described and claimed hereinbelow is also described in PCT/DE 03/01686, filed May 26, 2003 and DE 102 39 448.2, filed Aug. 28, 2002. This German Patent Application, whose subject matter is incorporated here by reference, provides the basis for a claim of priority of invention under 35 U.S.C. 119 (a)-(d).

BACKGROUND OF THE INVENTION

Background Information

The present invention is directed to a distance measuring device

A distance measuring device which represents the general class is known from DE 198 11 550 C2, with which a plurality of signals at different frequencies is produced by a single oscillator by dividing and filtering out harmonic frequencies.

SUMMARY OF THE INVENTION

The present invention is directed to a distance measuring device, in particular a laser distance measuring device, with at least one oscillator which produces a basic signal at a fundamental frequency, and a first circuit device which produces a first signal at a frequency which is higher than the fundamental frequency. It is proposed, according to the present invention, that the first circuit device include at least one PLL circuit and at least one VCO circuit.

A distance measuring device with a circuit device of this nature offers the advantage that the first frequency of the first signal produced by the circuit device can be much higher than the frequency of a signal which is suitable for use for the distance measuring device, and the first signal can be obtained by filtering a harmonic vibration and by amplification. The requirements on the phase resolution for achieving a certain measurement accuracy are therefore reduced, and a higher level of accuracy is attainable. A further advantage lies in the fact that the first frequency can be produced digitally, and no measurement frequency requirements due to filter elements need be taken into consideration. The present invention also offers the advantage that the circuit device functions without filter elements, including the associated adapter network and amplification circuits. Costs can be spared as a result.

A PLL ("phase locked loop") circuit and a VCO ("voltage-controlled oscillator") circuit are sufficiently known in the field of electronics. A PLL circuit compares the phase position of two signals and outputs a voltage which is a function of the phase position. A VCO circuit produces a signal at a frequency which is a function of the voltage input to the VCO circuit. Via the combination of a PLL circuit and a VCO circuit, a circuit device is therefore attainable with which a starting frequency produced by the VCO circuit can be adapted to a fundamental frequency with a high level of accuracy. Very high initial frequencies or starting frequencies with the same stability as the fundamental frequency of the oscillator are therefore attainable, whereby starting frequencies of over 1 GHz are possible. The desired starting frequency of the circuit device is attained by selecting a suitable VCO circuit, the starting frequency range of which includes the desired frequency.

The circuit device can be located directly behind the oscillator, so the basic signal at the fundamental frequency is forwarded to the PLL circuit. It is also possible, however, to locate one or more circuits which change the basic signal of the oscillator between the oscillator and the circuit device. For example, a frequency divider can be located between the oscillator and the circuit device, which divides the fundamental frequency produced by the oscillator into one or more lower frequencies. One or more of the lower starting frequencies of the frequency divider are forwarded to a circuit device, or a particular first circuit device, which produces a first signal at a first frequency which is higher than the fundamental frequency.

Advantageously, the circuit device includes a frequency divider which is provided to divide the first frequency. Frequency multiplication is thereby made possible in a simple manner. The frequency divider is used to divide the starting frequency of the VCO circuit, whereby the starting signal of the frequency divider is input to the PLL circuit for comparison with the signal which is forwarded directly to the PLL circuit or indirectly from the oscillator. The frequency divider advantageously divides the starting frequency of the VCO circuit down to the same frequency which is forwarded directly to the PLL circuit or indirectly from the oscillator.

A particularly simple circuit device is obtained by integrating the frequency divider in the PLL circuit.

In a preferred embodiment of the present invention, the first circuit device includes an LC filter which is located downstream from the VCO circuit. An LC filter of this type has inductance (L) and capacitance (C), and is used to improve signal quality, e.g., by filtering out harmonic vibrations produced by the circuit device. In this manner, a substantially sinusoidal starting signal of the first circuit device is obtained, which permits phase determination with a high level of accuracy in a subsequent measuring process.

In a further embodiment of the present invention, the distance measuring device includes a phase-shifting element which produces a second signal out of the basic signal, whereby the second signal has a second frequency which is different from the fundamental frequency, and the second signal is produced by transferring an input signal between discrete phase positions and whereby a second circuit device with a PLL circuit and a VCO circuit is located downstream from the phase-shifting element for producing a third signal at a third frequency which is higher than the second frequency. The second signal can be produced indirectly or directly from the basic signal. It is possible, for example, to locate a further element such as a frequency divider between the oscillator and the phase-shifting element, and to process the output signal from this further element using the phase-shifting element. With the second circuit device, the second signal is processed directly or indirectly after an intermediate signal processing element such that a third signal at a third and high frequency is produced. The first signal at the first frequency and the third signal at the third frequency are therefore derived from the basic signal produced by the oscillator; as a result, the two signals have a stable relationship with each other without any adjustment. As a result, the advantage can be obtained that the low-frequency mixed product of the first and third signal is just as stable as the basic signal from the oscillator and, in fact, without any adjustment. A frequency error between the individual signals at different frequencies is therefore ruled out, since they all trace back to a basic signal from the oscillator.

The phase-shifting element produces the second signal via synthetic, i.e., purely digital frequency shifting, for example.

As a result, even slight frequency deviations which are due to different sources of the signals, e.g., from a plurality of oscillators, are effectively avoided. Frequency pairs with closely adjacent and very high frequencies can be obtained, whereby "closely adjacent" is understood to mean a frequency difference which cannot be obtained via division from a starting frequency.

Advantageously, the first and/or second circuit device is provided to multiply its input frequency by a non-linear multiple. As a result, a simple evaluation of the phases of signals with frequencies which are shifted relative to each other can be achieved.

Detailed Description of the Preferred Embodiments

Figure 1:
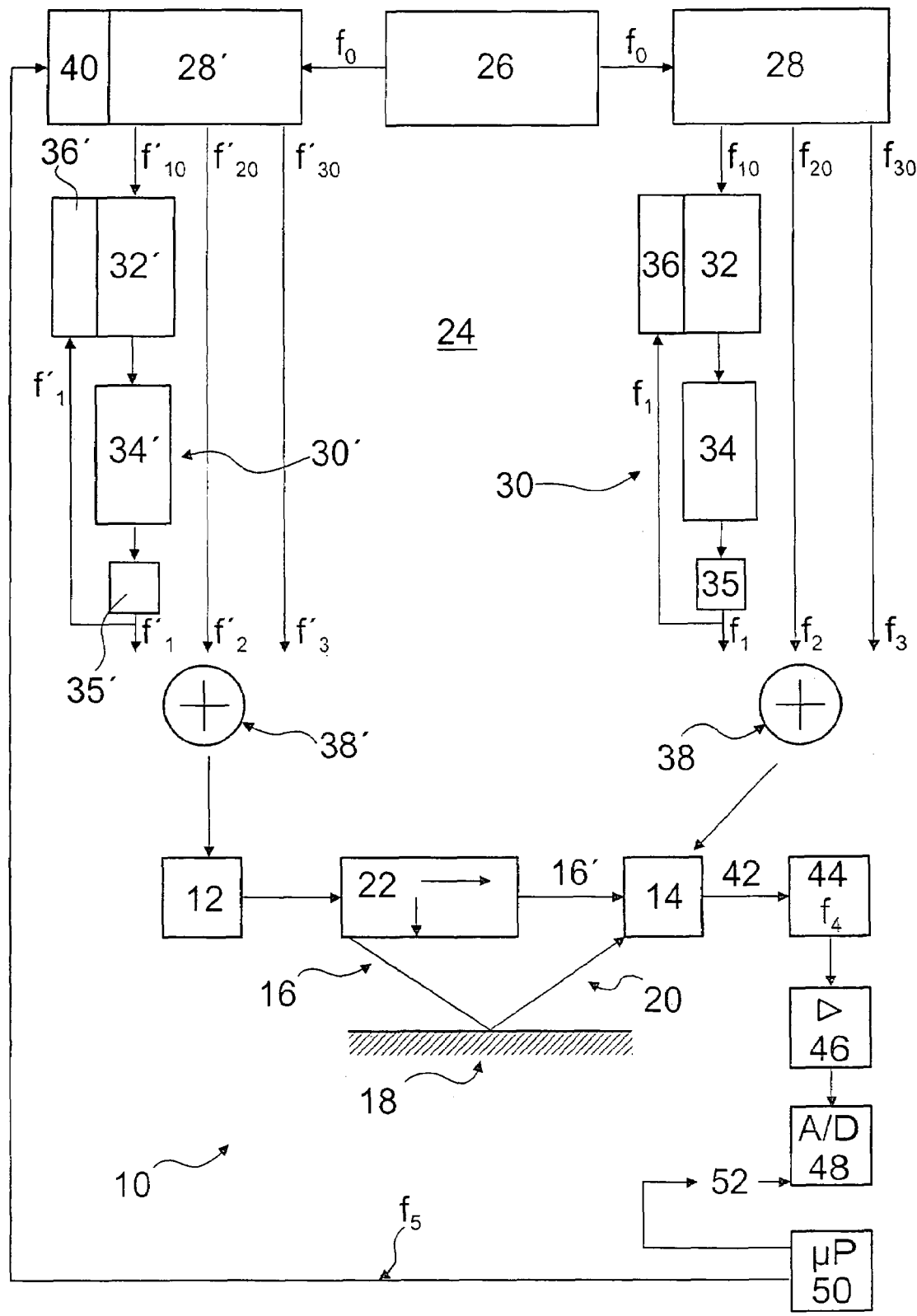
FIG. 1 shows a basic schematic diagram of a distance measuring device according to the present invention which is configured as a laser distance measuring device.

FIG. 1 shows a basic schematic diagram of a distance measuring device which is configured as a laser distance measuring device. Any signal which does not stand constantly on one direct-current value is considered hereinbelow to have a frequency f. The signal can be sinusoidal, rectangular or sinusoidal or rectangular only for a limited time. If the signal is rectangular, further frequencies occur in addition to the fundamental oscillation frequency f, the further frequencies being referred to as harmonic oscillations. The underlying theory is known from mathematics and will not be explained in further detail here.

If the signal is sinusoidal or rectangular only for a limited time—which is the case, for example, with signals whose phases are shifted by a constant phase angle in a regular chronological sequence—the signal is also referred to as having a frequency f. In this case, the numerical value f represents that frequency in the frequency spectrum with the greatest amplitude. In this case, frequencies can occur which are not a multiple of the frequency f. Frequencies of this type are also referred to hereinbelow as harmonic oscillations.

FIG. 1 shows a basic schematic diagram of a distance measuring device labelled 10. It includes an optical transmitter 12, e.g., a laser diode, and an optical receiver 14, e.g., a photodiode. Using optical transmitter 12, a collimated, visible, continuous-wave laser beam is produced as transmitted signal 16, which is visible on an object 18, also referred to hereinbelow as the target. Transmitted signal 16 is reflected by object 18 according to the laws of optics and is received as received signal 20 by optical receiver 14. Immediately after the target measurement, transmitted signal 16 is forwarded, as reference signal 16', to optical receiver 14 via an optical change-over switch 22, e.g., a movable flap.

A circuit arrangement 24 is provided which controls laser distance measuring device 10. It includes an oscillator 26, which is configured as a quartz oscillator. Oscillator 26 provides a fundamental frequency $f_0$, from which all frequencies explained in greater detail hereinbelow for operation of distance measuring device 10 are derived. To increase the unambiguous range of the distance measurement with distance measuring device 10, the device is operated at a total of three modulation frequencies for transmitted signal 16. Transmitted signal 16 itself is amplitude-modulated in known fashion. As a result, the received signal is also amplitude-modulated, in the same manner. Due to the fact that optical change-over switch 22 is switched over at a known point in time, it can be unambiguously determined based on the chronological sequence whether the instantaneous optical received signal came directly from optical change-over switch 22 or object 18.

Optical receiver 14 is configured as a known avalanche photodiode and allows a plurality of frequencies to be mixed simultaneously. The configuration and mode of operation of an avalanche photodiode of this type are known, so they will not be discussed in greater detail within the framework of the present description.

A first switchable frequency divider 28 is assigned to oscillator 26, via which the frequency $f_0$ provided by oscillator 26 is capable of being divided down to a frequency $f_{10}$, a frequency $f_{20}$, or frequency $f_{30}$. Frequencies $f_{10}$, $f_{20}$, $f_{30}$ can assume any value which is attainable by dividing fundamental frequency $f_0$. In addition, at least two of the frequencies can be identical.

A circuit device 30 is located downstream from frequency divider 28, which produces, out of the signal at frequency $f_{10}$, a first signal at a frequency $f_1$ which is higher than fundamental frequency $f_0$. Circuit device 30 includes a PLL circuit 32 and a VCO circuit 34. A frequency divider 36 is integrated in PLL circuit 32. VCO circuit 34 is a voltage-controlled oscillator and is designed to output a signal at frequency $f_1$ or a frequency which is located in a range around frequency $f_1$. Frequency divider 36 is designed to divide a signal at frequency $f_1$ down to a signal in the range of frequency $f_{10}$. PLL circuit 32 is a phase-locked loop and is provided for performing a phase comparison of the signal coming from frequency divider 36 with the signal of frequency $f_{10}$ coming from frequency divider 28.

Circuit device 30 includes an LC filter 35, which has inductance and capacitance. LC filter 35 filters out harmonic oscillations produced by circuit device 30 and is used to improve signal quality.

The first signal at frequency $f_1$ and the two other signals at frequencies $f_2$ and $f_3$ coming from frequency divider 28 are forwarded via a summing element 38 to optical receiver 14. Frequency $f_2$ corresponds to frequency $f_{20}$ output by frequency divider 28, and frequency $f_3$ corresponds to frequency $f_{30}$. It is also possible to direct signals at frequency $f_{20}$ or frequency $f_{30}$ output by frequency divider 28 through a bandpass filter and/or an amplifier, neither of which is shown, so that frequency $f_2$ or frequency $f_3$ need not necessarily correspond to frequency $f_{20}$ or $f_{30}$. It is also possible to locate circuit device 30 directly behind oscillator 26, so that the basic signal at fundamental frequency $f_0$ is used as the input signal for PLL circuit 32.

A further switchable frequency divider 28' is assigned to oscillator 26. Frequency divider 28' includes a digital circuit arrangement, which is configured as phase-shifting element 40. Signals at frequencies $f'_{10}$, $f'_{20}$ and $f'_{30}$ can be applied at the outputs of frequency divider 28'. These frequencies are transferred by phase-shifting element 40 at frequency $f_s$ in their phase. A mixture of a plurality of frequencies in the frequency spectrum therefore results. At least two of the frequencies $f'_{10}$, $f'_{20}$ and $f'_{30}$ can be identical.

Circuit device 30' includes a PLL circuit 32' and a VCO circuit 34'. A frequency divider 36' is integrated in PLL circuit 32'. VCO circuit 34' is designed to output a signal at frequency $f'_1$ or a frequency which is located in a range around frequency $f'_1$. Frequency divider 36' is designed to divide down a signal with frequency $f'_1$ to a signal in the range of frequency $f'_{10}$. PLL circuit 32' is provided to perform a phase comparison of the signal coming from frequency divider 36' with the signal at frequency $f'_{10}$ coming from frequency divider 28'. Every time phase-shifting element 40 shifts the phase of the signal at frequency $f'_{10}$ slightly, PLL circuit 32' builds up again, in conjunction with VCO circuit 34', until the signal at frequency $f'_{10}$ coming from frequency divider 36' again has the same phase position as the signal at frequency $f'_{10}$ coming from frequency divider 28'. In a manner analogous to that of circuit device 30, circuit device 30' also includes an LC filter 35', which has inductance and capacitance.

Optical receiver 14 is acted upon in chronological sequence by the optical signals listed below under A, and simultaneously with each optical signal, by the electrical signal listed under B:

| List A<br>Optical signals: | List B<br>Associated electrical signals: |
|---|---|
| Target signal 20 at frequency $f_1$ | Mixed signal at frequency $f_1$ |
| Target signal 20 at frequency $f_2$ | Mixed signal at frequency $f_2$ |
| Target signal 20 at frequency $f_3$ | Mixed signal at frequency $f_3$ |
| Reference signal 16' at frequency $f'_1$ | Mixed signal at frequency $f_1$ |
| Reference signal 16' at frequency $f'_2$ | Mixed signal at frequency $f_2$ |
| Reference signal 16' at frequency $f'_3$ | Mixed signal at frequency $f_3$ |

As a result, a transformation to an evaluation signal 42 takes place in a known manner via mixing. This evaluation signal 42 contains the necessary basic information, i.e., the phase angle of target signal 20 relative to an A/D converter clock cycle 52 and, chronologically thereafter, the phase angle of reference signal 16' relative to A/D converter clock cycle 52. Calculating the difference between the two phase angles per measurement frequency results in the reference variable, since it is unchanged in all consecutive measurements. The result is one phase angle per measurement frequency pair $f'_1$-$f_1$, $f'_2$-$f_2$ and $f'_3$-$f_3$, i.e., a total of three phase angles. The smallest frequency of frequencies $f'_1$, $f'_2$, and $f'_3$ determines the unambiguous range of the entire distance measurement. The largest frequency of frequencies $f'_1$, $f'_2$, and $f'_3$ determines the maximum possible measurement accuracy at a given measurement time. The frequency of $f'_1$, $f'_2$, and $f'_3$ which is located between the smallest and largest frequency is basically not required. It is used advantageously, however, when the measurement accuracy of the smallest frequency is not sufficient to place the measured result of the largest frequency in the correct range. The latter is necessary to measure distances which are greater than the unambiguous range of the highest frequency.

Frequency $f_3$ is selected to be relatively small, so that a slow A/D converter with high resolution can be used. Evaluation signal 42 is directed through an anti-aliasing filter 44 which is a bandpass filter for the evaluation signal at frequency $f_4$ and, from this, to an amplifier 46 and then an analog-to-digital converter 48. Converted evaluation signal 42 is forwarded to a microprocessor 50, which includes the appropriate arithmetic-logic units, memory units, counting units, etc., which determine the distance of object 18 from distance measuring unit 10. AND converter clock cycle 52 is provided simultaneously via microprocessor 50 to control analog-to-digital converter 48. Furthermore, a frequency signal $f_5$ (trigger signal) from microprocessor 50—the signal being in an at least partially fixed ratio to A/D converter clock cycle 52—is used to shift frequencies $f_{10}$, $f_{20}$ and $f_{30}$ to frequencies $f'_{10}$, $f'_{20}$, and $f'_{30}$.

In the exemplary embodiment it is assumed that oscillator 26 produces a basic signal at a fundamental frequency $f_0$=60 MHz. Frequency divider 28 divides fundamental frequency $f_0$ into frequency $f_{10}$=30 MHz, frequency $f_{20}$=15 MHz, and frequency $f_{30}$=1.875 MHz. Frequencies $f_{20}$ and $f_{30}$ are forwarded, unchanged, as frequencies $f_2$=15 MHz and $f_3$=1.875 MHz to summing element 38. The signal at frequency $f_{10}$ is input to PLL circuit. The phase position of this signal is compared with the phase position of a signal coming from frequency divider 36, whereby the comparison of the phases of the two signals is converted to an output voltage of PLL circuit 32. This voltage is used as the input variable for VCO circuit 34, which uses it to produce a signal at frequency $f_1$=900 MHz. The signal at frequency $f_1$ is input to frequency divider 36, which divides frequency $f_1$ of the signal down to frequency $f_{10}$. By comparing the phases of the two signals at frequency $f_{10}$ coming from frequency dividers 28 and 36 and the resultant output voltage of PLL circuit 32, VCO circuit 34 is triggered such that the signal at frequency $f_1$ output by it has the same stability and accuracy as the basic signal at fundamental frequency $f_0$ of oscillator 26.

Second frequency divider 28' assigned to oscillator 26 divides fundamental frequency $f_0$ of 60 MHz down—in a manner similar to that of frequency divider 28—into signals at frequencies $f'_{10}$, $f'_{20}$ and $f'_{30}$, whereby frequencies $f'_{10}$, $f'_{20}$ and $f'_{30}$ are digitally shifted by frequency $f_4$ relative to frequencies $f_{10}$, $f_{20}$, and $f_{30}$. Frequency $f_4$ is 2.929 kHz, so that frequency $f'_1$, which is obtained in a manner similar to that used to obtain frequency $f_1$, is 899.997 MHz. Frequency $f'_2$ is 29.997 MHz, and frequency $f'_3$ is 1.872 MHz. All frequencies are produced digitally with the aid of the trigger signal of frequency $f_5$ of microprocessor 50. In the exemplary embodiment it is assumed that trigger signal $f_5$ at frequency $f_1$=900 MHz and frequency $f_2$=15 MHz have exactly the 4-fold frequency of $f_4$. With each clock cycle of the trigger signal at frequency $f_5$=11.716 kHz, the phase of the signal at frequency $f_1$ or $f_2$ is shifted by 90°, so that a shift of 360° at frequency $f_4$=2.929 kHz takes place. At frequency $f_3$=1.875 MHz, trigger signal $f_5$ has the 32-fold frequency of $f_4$. The frequencies mentioned in this exemplary embodiment are stated as examples only. Other frequencies are also possible in other exemplary embodiments, of course.

REFERENCE NUMERALS 10 distance measuring device
12 optical transmitter
14 optical receiver
16 transmitted signal
18 object
20 received signal
22 switch-over device
24 circuit arrangement
26 oscillator
28 frequency divider
28' frequency divider
30 circuit device
30' circuit device
32 PLL circuit
32' PLL circuit
34 VCO circuit
34' VCO circuit
35 LC filter
35' LC filter
36 frequency divider
36' frequency divider
38 summing element
38' summing element
40 phase-shifting element
42 evaluation signal
44 anti-aliasing filter 46 amplifier
48 A/D converter
50 microprocessor
52 A/D converter clock cycle

What is claimed is:

1. A distance measuring device, comprising:
   at least one oscillator (26) which produces a basic signal at a fundamental frequency ($f_0$);
   a first circuit device (30) disposed behind the at least one oscillator (26) which produces a first signal at a first frequency ($f_1$) which is higher than that of the fundamental frequency ($f_0$),
   whereby the first circuit device (30) comprises at least one PLL circuit (32) and a VCO circuit (34);
   a phase-shifting element (40) which produces a second signal out of the basic signal at a second frequency which differs from the fundamental frequency ($f_0$) by transferring an input signal between discrete phase positions; and
   a second circuit device (30') located downstream from a PLL circuit (32') and a VCO circuit (34') which produces a third signal at a third frequency ($f'_1$) which is higher than the second frequency.

2. The distance measuring device as recited in claim 1, wherein the first circuit device (30) includes an LC filter (35) located downstream from the VCO circuit (34).

3. The distance measuring device as recited in claim 1, characterized by a frequency divider (36) which is integrated in the PLL circuit (32).

4. The distance measuring device as recited in claim 1, wherein the first and second circuit devices (30, 30') multiply a respective input frequency by a non-linear multiple.

5. The distance measuring device as recited in claim 1, consisting of a laser distance measuring device.

* * * * *